United States Patent [19]
Fyler

[11] Patent Number: 5,523,141
[45] Date of Patent: Jun. 4, 1996

[54] EXTENSIBLE COMPOSITE FABRIC AND METHOD AND APPARATUS FOR MAKING IT

[75] Inventor: Donald C. Fyler, Needham, Mass.

[73] Assignee: The Charles Stark Draper Laboratory, Inc., Cambridge, Mass.

[21] Appl. No.: 104,333

[22] Filed: Aug. 9, 1993

[51] Int. Cl.⁶ ............................... B32B 1/00; B32B 5/12; B32B 7/08; D06C 3/00
[52] U.S. Cl. ........................... 428/108; 26/51; 26/71; 112/2; 112/412; 112/413; 112/414; 112/415; 112/422; 112/428; 139/1 R; 139/11; 139/384 R; 139/386; 264/320; 264/324; 428/113; 428/174; 428/175; 428/179; 428/195; 428/198; 428/294; 428/542.8
[58] Field of Search .................... 428/108, 113, 428/174, 195, 198, 294, 175, 179; 139/1 R, 11, 384 R, 386; 112/2, 412, 413, 414, 415, 422, 428; 26/51, 71

[56] References Cited

U.S. PATENT DOCUMENTS

| | | | |
|---|---|---|---|
| 1,365,061 | 1/1921 | Respess | 428/108 |
| 3,573,151 | 3/1971 | Dawbarn | 428/108 |
| 3,616,129 | 10/1971 | Sager | 428/108 |
| 3,686,062 | 8/1972 | Romanin | 428/108 |
| 5,232,759 | 8/1993 | Golze | 428/97 |

Primary Examiner—James C. Cannon
Attorney, Agent, or Firm—Iandiorio & Teska

[57] ABSTRACT

An extensible composite fabric including a multiplicity of continuous fibers extending in one direction and distorted into aligned, locally parallel, curved paths for imparting extensibility to the fabric in that direction, and a method and apparatus for making such a composite fabric.

35 Claims, 5 Drawing Sheets

EXTENSIBLE COMPOSITE FABRIC AND METHOD AND APPARATUS FOR MAKING IT

FIELD OF INVENTION

This invention relates to an improved extensible continuous, oriented fiber composite fabric and a method and apparatus for making it.

BACKGROUND OF INVENTION

Composite fabrics are becoming ever more appealing because of their light weight, and lower cost. There are a number of types of composite fabrics which are currently made. There are those using broken fibers randomly oriented or regularly oriented and those using continuous fibers randomly oriented or regularly oriented. By fiber is meant herein a single fiber or a bundle of fibers, straight or twisted, and any other form or element used to make composite materials such as graphite, boron, glass or Kevlar. Those fabrics made of broken or continuous randomly oriented fibers are not as strong as they could be because they require a substantial quantity of bonding resin such as epoxy or a thermoplastic to hold them together. This results in only 30–40% of the volume being filled by the fibers which are the main source of strength. Broken, oriented fiber fabrics are somewhat higher in fiber volume but the many ends of the short, broken fibers tend to create stress risers that weaken the material. Continuous regular oriented fiber fabrics are preferred because they are quite strong due to the continuous nature of the fibers and the fact that they can be manufactured with up to 60–70% fiber by volume in the final part. However, they too have a shortcoming. Namely, in the ever-increasing demand for composite materials, there is the need for fabrics, which can quickly and naturally, without preforming or intervention, conform to molds in high speed fabrication procedures. But it has been discovered that continuous regular orientated fiber fabrics tend to hold their original form: they do not easily stretch and flexibly extend to conform to the mold and so they may be pinched and broken.

SUMMARY OF INVENTION

It is therefore an object of this invention to provide an improved, extensible composite fabric.

It is a further object of this invention to provide such an improved, extensible composite fabric from continuous, regularly oriented fibers.

It is a further object of this invention to provide such an improved, extensible composite fabric which is extensible in all directions of orientation of the continuous fiber as well as directions transverse to the fibers.

It is a further object of this invention to provide such an improved, extensible composite fabric which can be compacted and thus have greater fiber volume and strength than even continuous random oriented fiber fabrics.

It is a further object of this invention to provide a method and apparatus for making an improved extensible composite fabric.

The invention results from the realization that a continuous, oriented fiber composite fabric can be made extensible to easily conform to molds by bending the continuous fibers to follow aligned, locally parallel, curved paths to impart extensibility to the mat along the direction of the fibers.

This invention features an extensible composite fabric having a multiplicity of continuous fibers extending in one direction and distorted into aligned locally parallel curved paths for imparting extensibility to the fabric in that direction. In a preferred embodiment the curved path may be periodic and may be generally sinusoidal.

The invention also features an extensible composite fabric having a plurality of continuous layers, the fibers in each layer extending in a different direction and within each layer the continuous fibers being distorted into aligned locally parallel curved paths for imparting extensibility to the fabric in the direction of the fibers in that layer. In a preferred embodiment the layers may be interwoven, stitched together or bonded together and the curved paths may be periodic or generally sinusoidal.

The invention also features a method of making an extensible composite fabric including constructing a fabric from a multiplicity of continuous fibers extending generally parallel in a single direction and distorting those fibers into aligned locally parallel curved paths extending the same general direction for imparting extensibility to the fabric in that direction. In a preferred embodiment the method may include introducing a bonding agent to maintain the curved paths. The bonding agent may be a binder or an adhesive sheet. The bonding agent may be introduced before or after the fibers are distorted and the curved paths may be periodic or generally sinusoidal.

The invention also features a method of making an extensible composite fabric which includes constructing a fabric from a multiplicity of continuous fibers extending generally parallel in a first direction and a multiplicity of continuous fibers extending generally parallel in a second direction, and distorting the fibers in each of those first and second directions into aligned locally parallel curved paths extending in the same general direction for imparting extensibility to the fabric in each of the directions.

In a preferred embodiment a bonding agent may be introduced to maintain the curved paths. The bonding agent may be a binder or an adhesive sheet. The bonding agent may be introduced before or after the fibers are distorted. The curved paths may be periodic or sinusoidal. The layers may be interwoven, stitched together or bonded together.

The invention also features a mechanism for making an extensible composite fabric from a mat having a multiplicity of continuous fibers extending in one direction. There are a plurality of actuator members spaced apart in the direction of the continuous fibers extending across the fabric transverse to the continuous fibers. There is a number of engaging elements disposed on each actuator member for engaging the fabric and operator means are provided for moving alternate ones of the actuator members in opposite directions transverse to the continuous fibers for bending the fibers into aligned locally parallel curved paths for imparting extensibility to the fabric in the direction of the fibers. The curved paths may be periodic and/or sinusoidal.

The invention also features a mechanism for making an extensible composite fabric from a fabric having at least two layers of continuous fibers, the fibers in one layer extending in a first direction and a second layer extending in a second direction. There is a plurality of actuator members arranged in rows and columns generally aligned with the first and second directions, respectively. There are engaging means on each of the actuator members for gripping at least a pair of spaced points on the fabric and there are operator means for rotating alternate rows of actuator members in opposite directions for bending the fibers in each layer into aligned locally parallel curved paths for imparting extensibility to the fabric in both directions.

In a preferred embodiment the engaging means may include an areal gripping element for gripping the two spaced points and the area between them. The engaging means may include two spaced pins. The operator means may include interconnection links interconnecting actuator members in adjacent rows and columns. The links may include engaging means and the curved paths may be periodic and/or sinusoidal.

The invention also features a mechanism for making an extensible composite fabric from a fabric having a multiplicity of continuous fibers extending in one direction. There are conveyor means for continuously moving a web of composite material and first roller means spaced from the conveyor means and contacting the web of composite material. There are oscillator means for shifting the first roller back and forth across the composite material to distort the fibers into aligned locally parallel curved paths for imparting extensibility to the fabric in the direction of the continuous fibers.

In a preferred embodiment there may be a second roller for pinching the web after the web passes from the first roller, and there may be drive means for driving the second roller at the speed of the conveyor means.

DISCLOSURE OF PREFERRED EMBODIMENT

Other objects, features and advantages will occur to those skilled in the art from the following description of a preferred embodiment and the accompanying drawings, in which.

Figure 1:
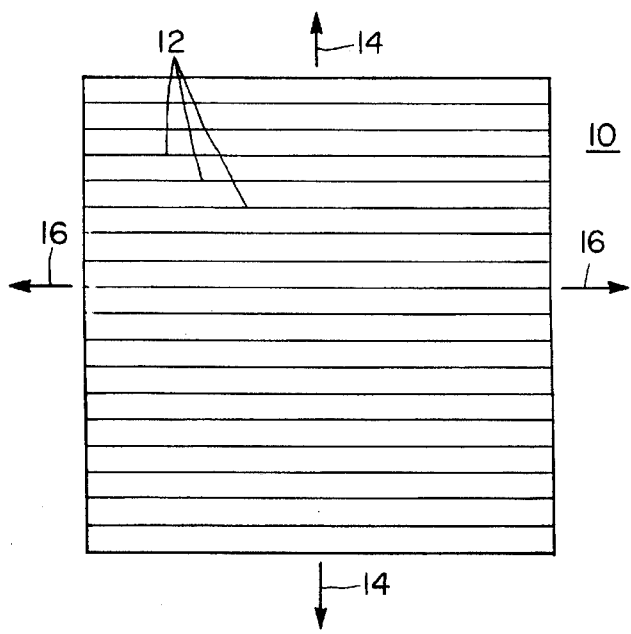
FIG. 1 is a schematic plan view of a unidirectional continuous fiber composite fabric.

There is shown in FIG. 1 a unidirectional continuous fiber composite fabric 10 which includes a multiplicity of continuous fibers 12 which all extend generally in the same direction and are generally straight and parallel to each other. Fibers 12 may be made of any conventional elements used in composite materials, such as graphite, boron, glass or Kevlar, and they may be held together with such bonding agents as epoxy or thermoplastic materials or stitching, as is well known in the art. Fabric 10 will typically be quite easily extensible in the lateral direction, arrows 14, transverse to the direction of the continuous fibers 12, but will not be easily extensible in the direction, arrows 16, parallel to the direction of the continuous fibers 12. This makes it difficult to use fabrics such as this in molding procedures for complex parts without the use of human intervention or pre-forming, which substantially adds to the cost and time required in such procedures.

Figure 2:
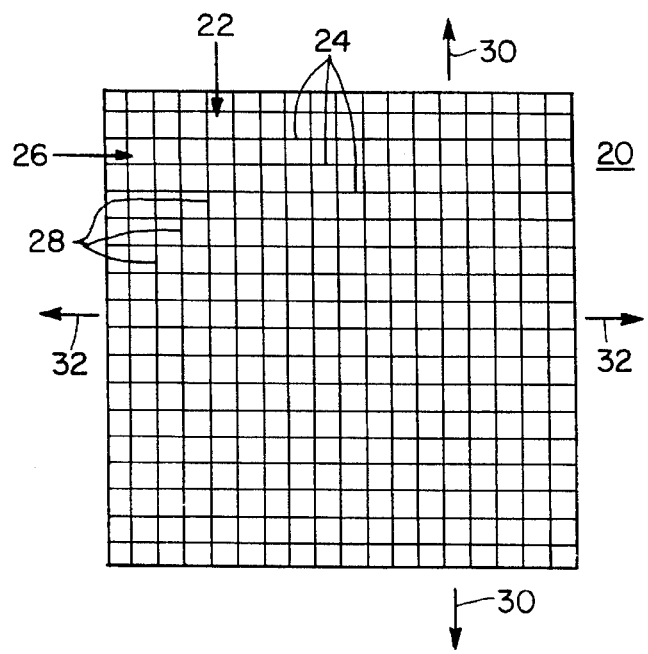
FIG. 2 is a schematic plan view of a bidirectional continuous fiber composite fabric.

Fabric 20, FIG. 2, is a bidirectional continuous fiber composite fabric which includes a first layer 22 made up of a multiplicity of fibers 24 which run in the horizontal direction, and a second layer 26 comprised of a multiplicity of fibers 28 that run in the vertical direction as shown in FIG. 2. These fibers may be the same types of materials explained with respect to FIG. 1 and may be held in place or bonded using the same bonding agents or stitching. Fabric 20, since it has fibers 24 and 28 running in both directions, is extensible in neither. Thus it cannot be extended either in the direction indicated by arrows 30, or in the direction indicated by arrows 32, thereby making molding processes even more difficult.

Figure 3:
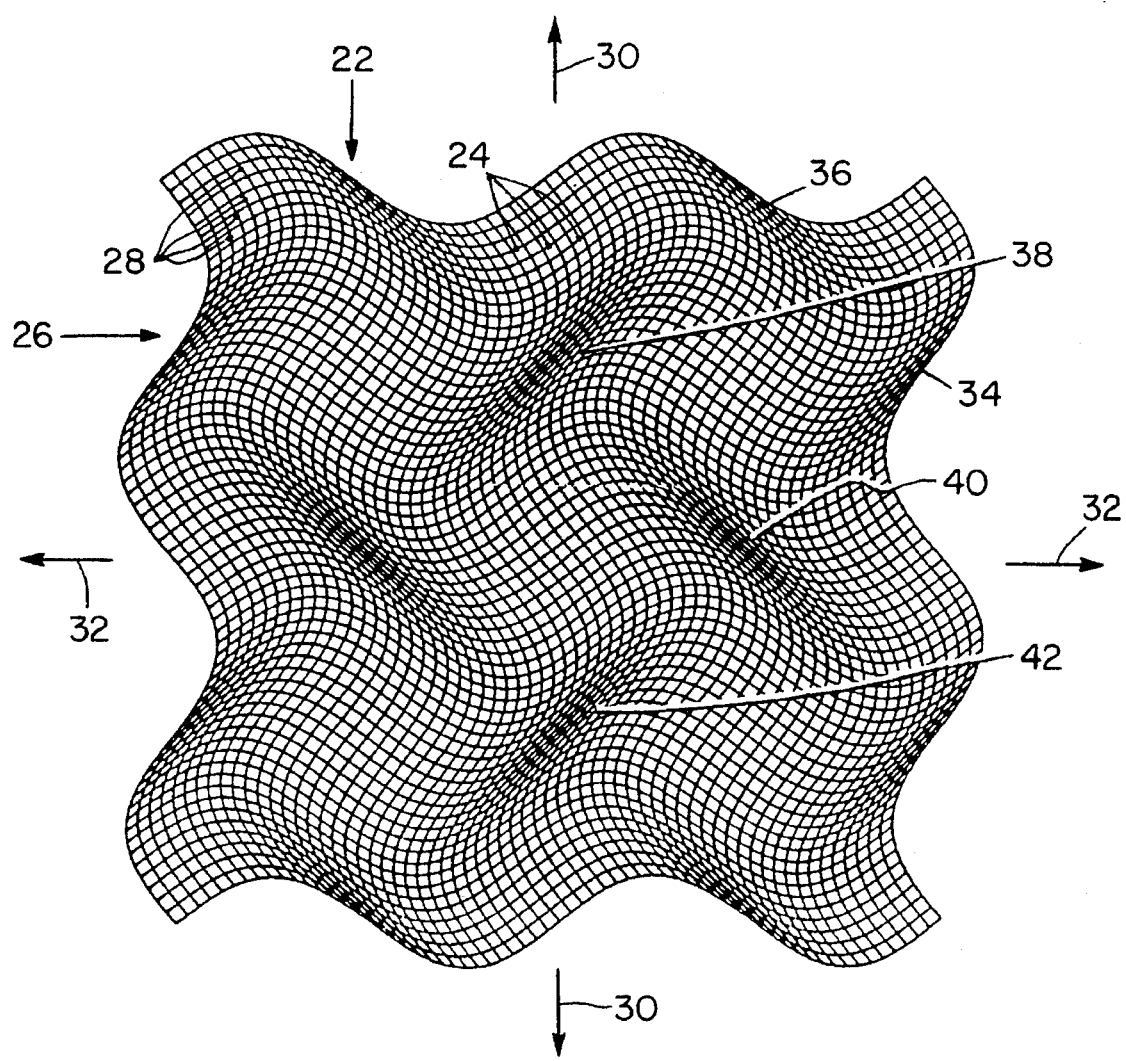
FIG. 3 is a schematic plan view of an extensible composite mat according to this invention formed from the fabric of FIG. 2.

However, in accordance with this invention even a bidirectional continuous fiber composite fabric 20, FIG. 2, can be made to be extensible in both directions 30 and 32, as shown in FIG. 3, where fabric 20a has in accordance with this invention been distorted. That is, each of the fiber elements 26, 24 and 28 have been bent in curved paths which are locally parallel. The fibers still extend generally in the same directions as they did before, 30 and 32, and they are generally aligned or locally parallel to each other, but they are in a generally curved path. "Curved path" here is used in its broadest sense to include periodic and aperiodic waveforms as well as those that may not be considered truly curved, for example, triangular or sawtooth patterns. By bending the fibers in this way, the overall area of fabric 20a is somewhat shrunk compared to that of fabric 20, but what is gained is the extensibility in both directions 30 and 32. This occurs because as can be seen by the darkened areas at 34, 36, 38, 40 and 42 for example, the fibers have been crowded together. This crowding or bunching allows for extensibility subsequently when fabric 20a is introduced into a molding machine and the molds are closed on it. It should be appreciated that although in FIG. 3, because of the limitations of a two-dimensional drawing, fabric 20a appears to have dramatic topological relief, this is not the case. In fact, fabric 20a is quite as flat as fabric 20. The illusion of peaks and valleys is simply that: an illusion. It is truly a two-dimensional depiction of two-dimensional phenomena, and the crowding or spacing between the various fibers shows only that the spacing is in fact less or more and does not indicate elevations.

Figure 4:
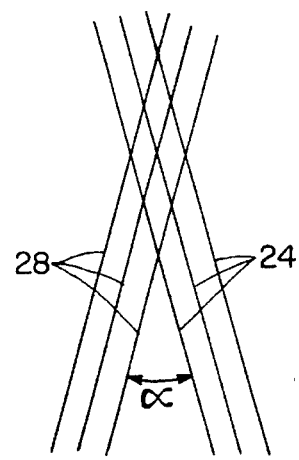
FIG. 4 is a schematic diagram showing the maximum trellis angle α to prevent buckling and folding of the fabric in FIG. 3.

The maximum angle to which the fibers can be bent is dictated by the trellis angle α, FIG. 4, which is the minimum angle that can be tolerated between the two sets of fibers 24 and 28 before the fibers begin to roll over each other and bunch, and indeed cause an undesirable buckling and piling up of the fabric 20a.

Figure 5:
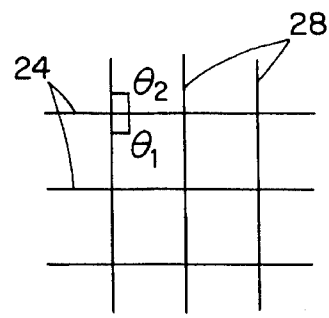
FIG. 5 is a schematic diagram showing the position of the fibers of FIG. 2 before bending.
Figure 6:
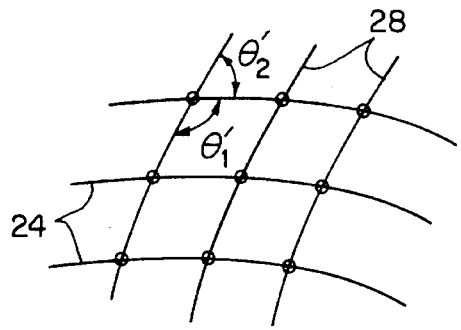
FIG. 6 is a schematic diagram showing the position of the fibers of FIG. 3 after bending.

An important feature of the bending of fibers 24 and 26 to create fabric 20a, FIG. 3, is that the fibers or tows do not slip over each other or move with respect to one another relative to the transverse fibers. For example, as shown in FIG. 5, transverse fibers 24 and 28 cross each other with regular spacing. That same spacing is maintained in FIG. 6 so that none of the fibers 24 or 28 have slipped with respect to the transverse fibers 28 or 24, respectively. The only thing that has changed are the angles $\theta_1$ and $\theta_2$ of the intersection, which while originally 90° in FIG. 5 are now greater than 90°, $\theta_1$', and less than 90°, $\theta_2$'.

Figure 7:
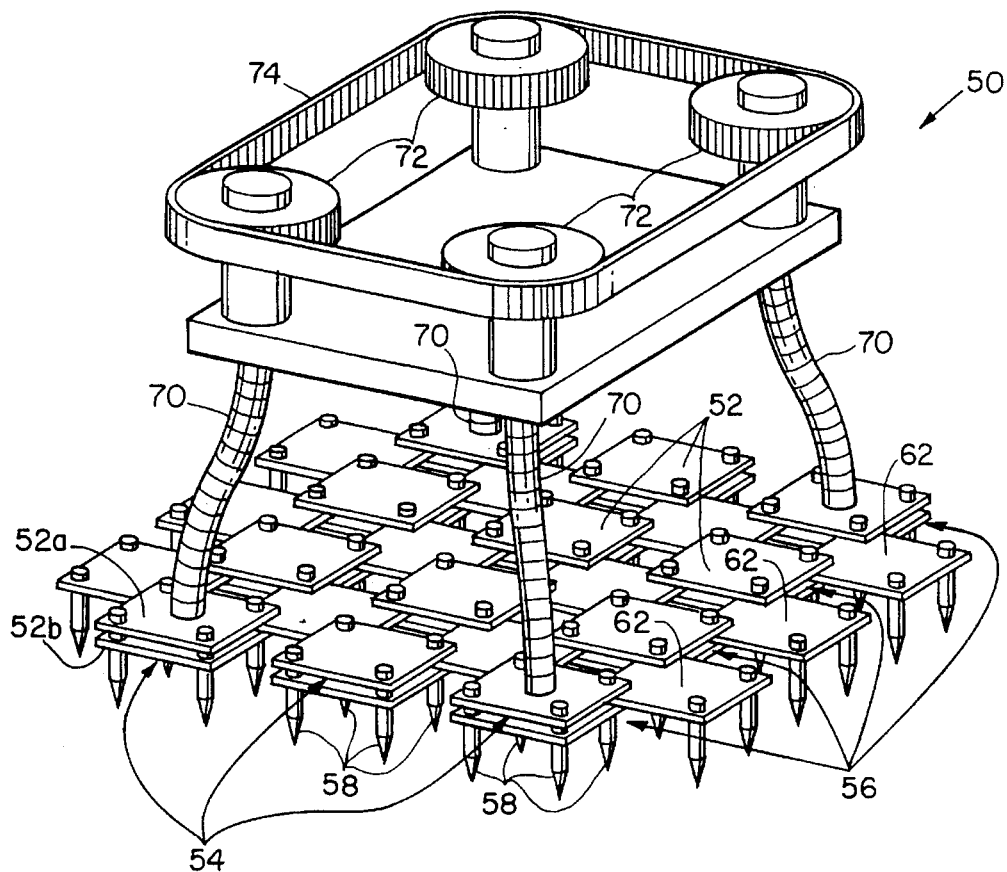
FIG. 7 is a three-dimensional view of an apparatus for creating the extensible fabric of FIG. 3 from the non-extensible mat of FIG. 2.

An apparatus 50, FIG. 7, for accomplishing this bending includes a plurality of actuator members 52 arranged in three columns 54 and four rows 56. Each actuator member includes four pins 58 which have sharp points as shown in FIG. 7 that engage and grip fabric 20 typically disposed on a table (not shown). Pins 58 also act as pivots to rotatably interconnect with operator members 62. Each actuator member 52 may include a top plate 52a and bottom plate 52b. In addition, extra pins may be employed on the operator members 62 so that they too contribute to the bending of the fibers.

Figure 8:
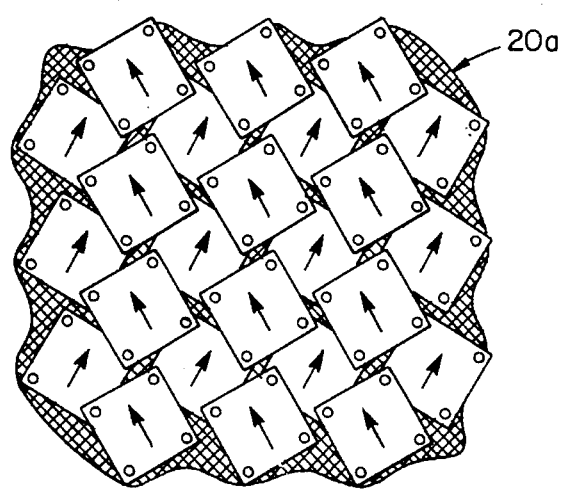
FIG. 8 is a view similar to FIG. 5 after the apparatus has been actuated to create the form of the fabric shown in FIG. 3.

In operation, four flexible drive shafts 70 fixed to the four corner actuator members 52 are driven by four pulleys or gears 72 by means of belt or chain 74 driven by a motor not shown. This rotates members 52 and 62 as shown in FIG. 8, causing the fibers to be bent with the result shown in FIG. 3.

Figure 9:
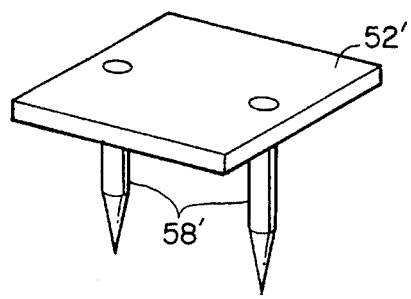
FIG. 9 is a three-dimensional view of a two pin actuator similar to the four pin actuators in FIG. 7–9.
Figure 10:
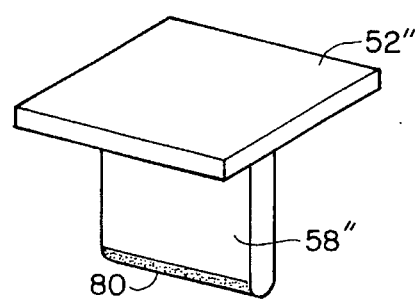
FIG. 10 is a three-dimensional view of an actuator similar to that shown in FIG. 10 but with a frictional area used instead of two spaced pins.

Although thus far the apparatus is shown using four pins per actuator member, this is not a necessary limitation of the invention: actuator member 52', FIG. 9, may be employed using but two pins 58'. The bending technique works just so long as there are at least two spaced points that are locally rotated. This can also be accomplished by actuator member 52", FIG. 10, which replaces pins 58' with a pad 58" that has a friction surface 80 on its bottom to grasp not only two spaced points but the area of the fabric in between as well.

Figure 11:
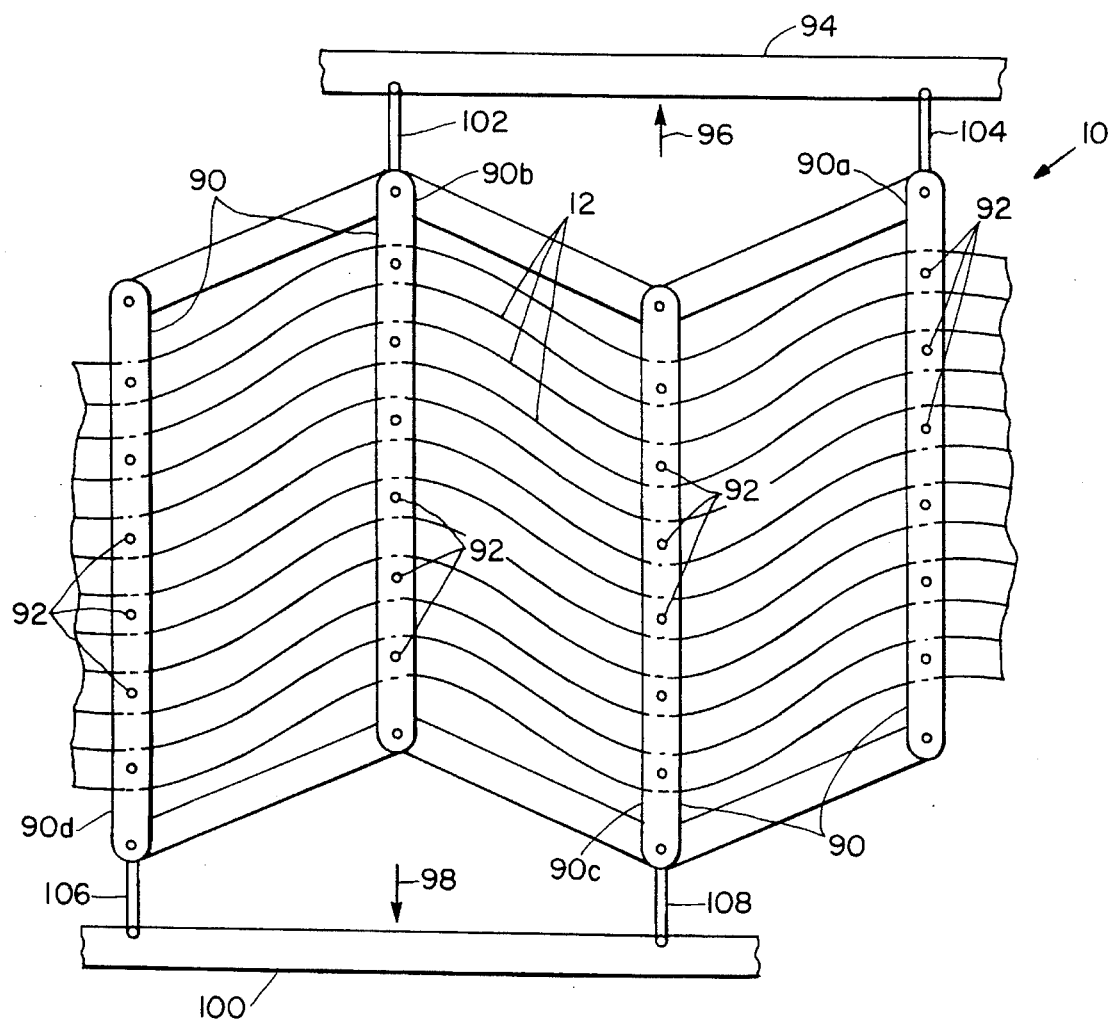
FIG. 11 is an apparatus for bending the fibers in a unidirectional continuous fiber composite fabric such as shown in FIG. 1.

A mechanism for providing a periodic sinusoidal bending to fiber element 12 of unidirectional fabric 10 in FIG. 1 is shown in FIG. 11, where it is comprised of a plurality of actuator members 90 which are spaced from each other in the direction of the extent of the continuous fibers 12. Each member 90 extends transversely across fibers 12 and contains a plurality of spaced engaging members such as pins 92. In operation an operator bar 94 linked to alternate members 90a and 90b is drawn in the direction indicated by arrow 96 while actuator members 90c and 90d are drawn in the opposite direction of arrow 98 by moving actuator bar 100. In this way a periodic sinusoidal waveform is imparted to fibers 12. Operator bar 94 is interconnected with members 90a, 90b by links 102 and 104 which are pivotally attached at each end. Similar links 106, 108 interconnect actuator member 90c and 90d with actuator bar 100.

Figure 12:
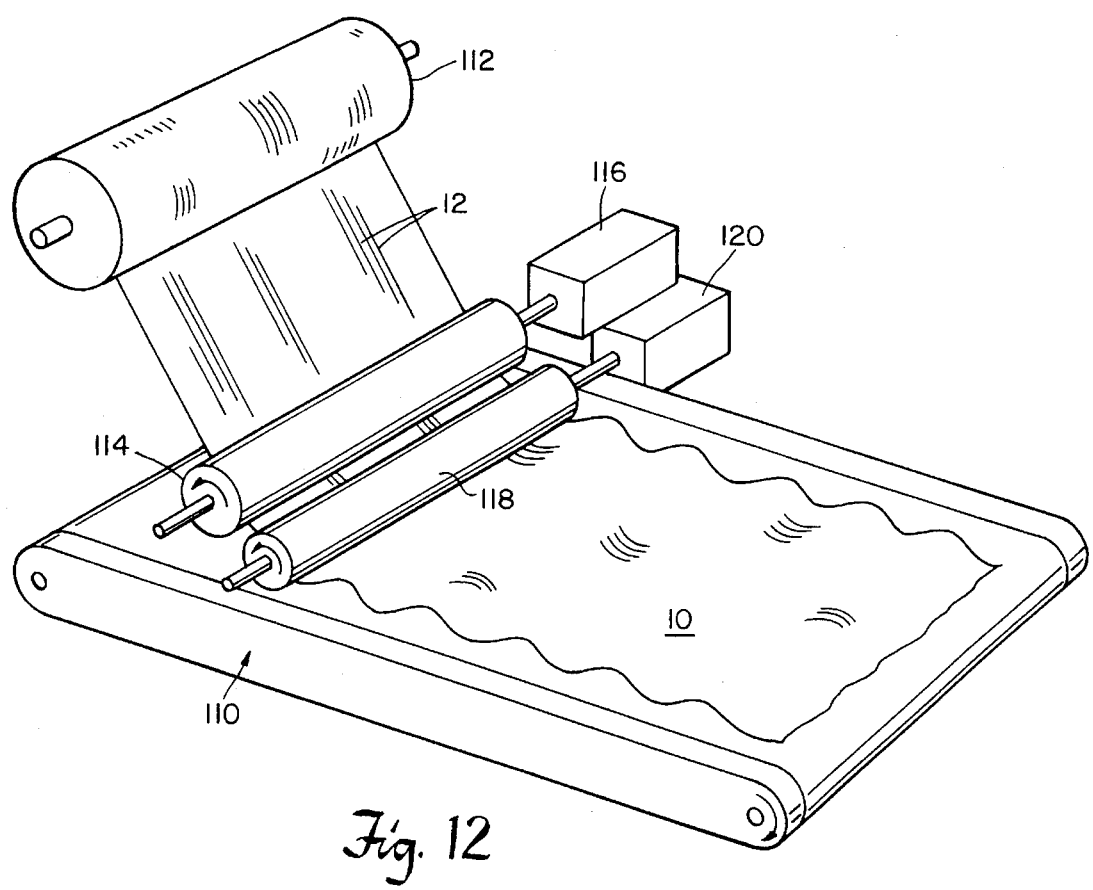
FIG. 12 is an alternative apparatus for bending the fibers in a unidirectional continuous fiber composite fabric as shown in FIG. 1.

In another embodiment, more suited to a continuous process, fabric 10, FIG. 12, can be created by a conveyor mechanism 110 in conjunction with a source of straight continuous fiber fabric such as roll 112 and an oscillating roller 114 which may be an idler roller which is shifted to and fro transversely across fabric 10 transverse to the direction of its travel and to the direction of continuous fibers 12 by means of oscillator driver 116. A pair of pinch rollers or a single pinch roller 118 in close juxtaposition to conveyor 110 may be used to capture fabric 10 as it leaves roller 114 and fix the bend imparted to the fibers by roller 114. Roller 118 is preferably driven at approximately the speed of conveyor 110 by drive unit 120. In other applications, the curved paths bent into the fibers 12 in the unidirectional form, and fibers 24 and 28 in the bidirectional form, may be set or held by means of a binder made of b-staged resin, for example, or stitching which may be introduced to the mat before or after the bending process. In some instances the friction of the fibers may be sufficient for them to remain set in the new bent position.

Figure 13:
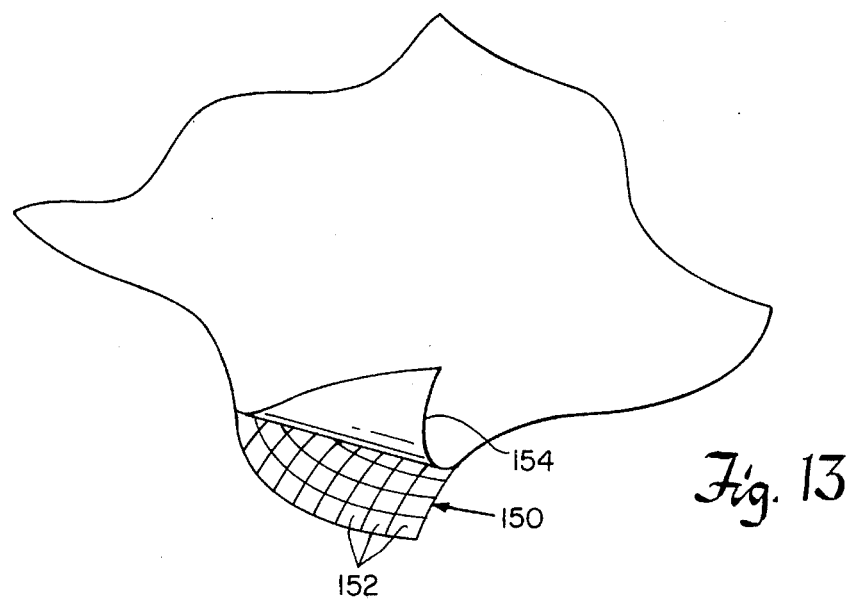
FIG. 13 is a schematic diagram showing two techniques for fixing the curved paths after the bending of the fibers.

The finished extensible composite mat 150, FIG. 13, according to this invention may be provided with a bonding agent or binder 152, or with an adhesive oversheet 154 to ensure that the curvature imparted to the fibers is maintained until the fabric 150 is brought to the molding process or other subsequent step in its fabrication.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of making an extensible fabric comprising:
   placing a fabric comprising, a multiplicity of continuous fibers extending in generally parallel paths in a first direction and a multiplicity of continuous fibers extending in generally parallel paths in a second direction, said fabric being essentially non-extensible in the directions of said paths, in an apparatus capable of mechanically distorting the paths of the continuous fibers in each of said first and second directions; and distorting the paths of the fibers in each of those first and second directions into aligned, locally parallel, curved paths extending in the same general direction to impart extensibility to the fabric in each of said directions.

2. The method of making an extensible composite fabric of claim 1 including introducing a bonding agent to maintain the curved paths.

3. The method of making an extensible composite fabric of claim 1 in which said bonding agent is a binder.

4. The method of making an extensible composite fabric of claim 1 in which said bonding agent is an adhesive sheet.

5. The method of making an extensible composite fabric of claim 1 in which said bonding agent is introduced after the fibers are distorted.

6. The method of making an extensible composite fabric of claim 1 in which said curved path is periodic.

7. The method of making an extensible composite fabric of claim 6 in which said curved path is generally sinusoidal.

8. A method of making an extensible fabric comprising:
   placing a fabric comprising a multiplicity of continuous fibers extending in generally parallel paths in a single direction, said fabric initially having been essentially non-extensible in the direction of said paths, in an apparatus capable of mechanically distorting the paths of the continuous fibers in the single direction; and distorting the paths of the fibers in that single direction into aligned, locally parallel, curved paths extending in the same direction to impart extensibility to the fabric in that direction.

9. The method of making an extensible composite fabric of claim 8 including introducing a bonding agent to maintain the curved paths.

10. The method of making an extensible composite fabric of claim 9 in which said bonding agent is a binder.

11. The method of making an extensible composite fabric of claim 9 in which said bonding agent is an adhesive sheet.

12. The method of making an extensible composite fabric of claim 9 in which said bonding agent is introduced after the fibers are distorted.

13. The method of making an extensible composite fabric of claim 8 in which said curved path is periodic.

14. The method of making an extensible composite fabric of claim 13 in which said curved path is generally sinusoidal.

15. A mechanism for making an extensible fabric from a fabric comprising a multiplicity of continuous fibers extending in generally parallel paths in one direction, said fabric initially having been essentially non-extensible in that direction, comprising:

a plurality of actuator members spaced apart in the direction of the continuous fibers extending across the fabric transverse to the continuous fibers thereof when the mechanism engages the fabric; and operator means for moving alternate ones of said actuator members in opposite directions transverse to the continuous fibers for bending the fibers into aligned, locally parallel, curved paths for imparting extensibility to the fabric in the direction of the paths.

16. The mechanism for making an extensible composite fabric of claim 15 in which said curved path is periodic.

17. The mechanism for making an extensible composite fabric of claim 16 in which said curved path is generally sinusoidal.

18. A mechanism for making an extensible fabric from a fabric comprising at least two layers of fibers extending in generally parallel paths, the paths in one layer extending in a first direction and in a second layer in a second direction, said fabric initially having been essentially non-extensible in the respective path directions, comprising:

a plurality of actuator members arranged in rows and columns generally aligned with the first and second directions, respectively when the mechanism engages the fabric;

an engaging means on each of said actuator members for gripping at least a pair of spaced points on the fabric; and operator means for rotating alternative rows of actuator members in opposite directions for bending the paths of the fibers in each layer into aligned locally parallel, curved paths for imparting extensibility to the fabric in each respective path direction.

19. The mechanism for making an extensible composite fabric of claim 18 in which said engaging means includes an areal gripping element for gripping said two spaced points and the area between them.

20. The mechanism for making an extensible composite fabric of claim 18 in which said engaging means includes an areal gripping element for gripping said two spaced points.

21. The mechanism for making an extensible composite fabric of claim 18 in which said operator means includes interconnection links interconnecting actuator members in adjacent rows and columns.

22. The mechanism for making an extensible composite fabric of claim 18 in which said interconnection links include engaging means.

23. The mechanism for making an extensible composite fabric of claim 18 in which said curved path is periodic.

24. The mechanism for making an extensible composite fabric of claim 23 in which said curved path is generally sinusoidal.

25. A mechanism for making an extensible fabric from a fabric comprising a multiplicity of continuous fibers extending in generally parallel paths in one direction, said fabric initially having been essentially non-extensible in the direction of said paths, comprising:

conveyor means for continuously moving a fabric;

first roller means spaced from said conveyor means for contacting said fabric; and oscillating means for shifting said first roller back and forth across said fabric to distort the initially generally parallel paths of continuous fibers comprising the fabric into aligned, locally parallel curved paths for imparting extensibility to the fabric in the direction of said paths.

26. The mechanism for making an extensible composite fabric of claim 25 including a second roller for pinching said web after said web passes from said first roller.

27. The mechanism for making an extensible composite fabric of claim 26 including drive means for driving said second roller at the speed of the conveyor means.

28. An extensible composite fabric comprising:

a multiplicity of continuous fibers extending in one direction and distorted into aligned, locally parallel, curved paths for imparting extensibility to the fabric in that direction.

29. The extensible composite fabric of claim 1 in which said curved path is periodic.

30. The extensible composite fabric of claim 2 in which said curved path is generally sinusoidal.

31. An extensible composite fabric comprising:

a plurality of layers of continuous fibers, the continuous fibers of each layer extending in a different direction and within each layer the continuous fibers being distorted into aligned, locally parallel, curved paths for imparting extensibility to the fabric in the direction of the paths of continuous fibers in that layer.

32. The extensible composite fabric of claim 31 in which said layers are interwoven.

33. The extensible composite fabric of claim 31 in which said layers are stitched together.

34. The extensible composite fabric of claim 31 in which said curved path is periodic.

35. The extensible composite fabric of claim 31 in which said curved path is generally sinusoidal.

* * * * *